United States Patent [19]
Hettinga

[11] Patent Number: 5,902,525
[45] Date of Patent: May 11, 1999

[54] METHOD OF MOLDING A PLASTIC ARTICLE INCLUDING INJECTING BASED UPON A PRESSURE-DOMINATED CONTROL ALGORITHM AFTER DETECTING AN INDICIA OF A DECREASE IN THE SURFACE AREA OF THE MELT FRONT

[76] Inventor: Siebolt Hettinga, 2123 NW. 111th St., Des Moines, Iowa 50325

[21] Appl. No.: 08/648,221

[22] Filed: May 13, 1996

Related U.S. Application Data

[63] Continuation-in-part of application No. 08/492,232, Jun. 19, 1995, abandoned.

[51] Int. Cl.$^6$ .................................................. B29C 45/77
[52] U.S. Cl. ...................... 264/40.1; 264/40.5; 264/40.7; 264/328.13; 425/145; 425/147; 425/149; 364/475.08
[58] Field of Search .................................. 264/40.1, 40.5, 264/40.7, 328.1, 328.12, 328.13; 425/145, 147, 149, 150; 364/475.05, 475.08

[56] References Cited

U.S. PATENT DOCUMENTS

| | | | |
|---|---|---|---|
| 3,904,078 | 9/1975 | Neff et al. ................................ | 425/145 |
| 4,435,142 | 3/1984 | Morita et al. ....................... | 264/328.13 |
| 4,745,541 | 5/1988 | Vaniglia et al. . | |
| 4,774,675 | 9/1988 | Kagawa . | |
| 4,802,097 | 1/1989 | Tanaka et al. . | |
| 4,805,112 | 2/1989 | Neko . | |
| 4,816,196 | 3/1989 | Otake . | |
| 4,823,274 | 4/1989 | Kiya et al. . | |
| 4,837,490 | 6/1989 | Neko . | |
| 4,847,779 | 7/1989 | Masao et al. . | |
| 4,849,143 | 7/1989 | Langecker . | |
| 4,849,678 | 7/1989 | Kamiguchi et al. . | |
| 4,851,170 | 7/1989 | Shimizu et al. ...................... | 264/328.1 |
| 5,005,116 | 4/1991 | Fujita et al. . | |
| 5,012,426 | 4/1991 | Harada et al. . | |
| 5,016,184 | 5/1991 | Gutjahr . | |
| 5,031,108 | 7/1991 | Fugita et al. . | |
| 5,031,127 | 7/1991 | Fugita et al. . | |
| 5,062,052 | 10/1991 | Sparer et al. . | |
| 5,062,053 | 10/1991 | Shirai et al. . | |
| 5,095,419 | 3/1992 | Seki et al. . | |
| 5,097,431 | 3/1992 | Harada et al. . | |
| 5,097,432 | 3/1992 | Harada et al. . | |
| 5,102,587 | 4/1992 | Kumamura et al. .................... | 264/40.5 |
| 5,336,073 | 8/1994 | Hiraoka ................................. | 264/40.5 |
| 5,425,906 | 6/1995 | Hashimoto ............................. | 425/145 |
| 5,514,311 | 5/1996 | Shimizu et al. ..................... | 264/328.1 |
| 5,549,857 | 8/1996 | Kamiguchi et al. ................... | 425/147 |

FOREIGN PATENT DOCUMENTS

| 46-14138 | 4/1971 | Japan ................................ 264/328.13 |

*Primary Examiner*—Jill L. Heitbrink
*Attorney, Agent, or Firm*—Brian J. Laurenzo; Michael C. Gilchrist

[57] ABSTRACT

A method for injecting a plastic material into a mold cavity to precisely fill the mold cavity under low pressure and to avoid packing the mold cavity with plastic material. The plastic material is injected into the mold cavity at a rate sufficient to maintain an unbroken melt front and to avoid any spraying or splashing of the plastic material within the mold cavity. After an initial unbroken melt front is established, the rate at which the material is injected is increased in proportion to the size of the melt front. After a predetermined amount of the material has entered the mold cavity, the material is injected based upon a rate-dominated control algorithm which maintains the unbroken melt front. After detecting an indicia of a decrease in the surface area of the melt front, the material is injected based upon a pressure-dominated control algorithm where the injection rate is adjusted as needed so that an injection set limit is not exceeded in order to prevent overrunning the end point of the mold process and to eliminate splashing and associated backflow problems. The injection pressure is monitored and controlled until the mold cavity has been precisely filled, at which time the injection pressure is maintained until the plastic article has hardened within the mold cavity. By filling the mold cavity exactly, the prior art problems associated with packing, such as warping and flash, are eliminated in the present invention and a more uniform product is produced from less material.

38 Claims, 9 Drawing Sheets

% OF MOLD CAVITY FILLED

% OF MOLD FILLED

METHOD OF MOLDING A PLASTIC ARTICLE INCLUDING INJECTING BASED UPON A PRESSURE-DOMINATED CONTROL ALGORITHM AFTER DETECTING AN INDICIA OF A DECREASE IN THE SURFACE AREA OF THE MELT FRONT

RELATED APPLICATIONS

This is a continuation-in-part of application Ser. No. 08/492,232, filed Jun. 19, 1995 now abandoned.

BACKGROUND OF THE INVENTION

This invention relates to a method for molding a plastic article and, more particularly, to a method for molding a plastic article which includes injecting based on a pressure-dominated control algorithm after detecting an indicia of a decrease in the surface area of the melt front along the leading edge of injected plastic material in order to effectively mold a plastic article without overfilling or packing a mold cavity with plastic material.

Injection molding machines generally include a two-section mold unit wherein a first section is stationary, and a second section is moveable between an open position away from the first section, and a closed position in sealed engagement with the first section in order to form a mold cavity. Typically, a gate opening in the first section allows the injection of plastic material into the mold cavity.

Once the mold cavity has been formed, a reciprocating screw or similar injection device is used to inject a plastic material through the gate opening into the mold cavity where the plastic material hardens with time. As the plastic material is injected into the mold cavity, the leading edge of the plastic material forms a melt front which spreads across the mold cavity as the mold cavity fills. The plastic material is typically injected into the mold cavity very quickly under high pressure to prevent the melt front from hardening too quickly and blocking the mold cavity. Unfortunately, as the mold cavity is filled, the plastic material begins to backflow, causing turbulence and requiring greater clamp pressures and injection pressures.

To overcome the backflow associated with prior art processes, and to assure that the mold cavity becomes completely filled with plastic material, a volume of plastic material greater than the volume of the mold cavity is injected into the mold cavity and maintained under high pressure until the plastic begins to harden. The injection of an excess amount of material into the mold cavity requires a sharp pressure increase in order to pack the material into the mold cavity. This sharp pressure increase is often referred to as a "spike." While injecting excessive plastic material into the mold cavity results in completely filling the mold cavity during the molding process, the resulting pressure spike causes enormous outward pressure on the mold sections, leading to an increased amount of wear on the mold sections and clamping apparatus. Despite constructing mold units of steel to handle the pressure spikes associated with prior art molding processes, these mold units often wear prematurely, requiring the mold units to be returned to the manufacturers for repair. Depending on the severity of the wear and the repair schedule of the manufacturers, worn mold units can be out of service for several weeks. The loss of production associated with the repair of cracked mold units is generally very costly.

The increased outward pressure on the mold sections may even lead to movement of the mold sections away from one another. When the mold sections move apart, plastic material seeps into the parting line between the mold sections. The plastic material which seeps into the parting line and forms as a portion of the finished plastic part is often referred to as "flash." This "flash" is not only aesthetically undesirable on a finished plastic part, but also leads to a waste of material and creates an uneven parting line between the mold sections. As the clamping apparatus presses the mold sections together against the plastic hardening at the parting line, the parting line becomes deformed and uneven, thereby making the occurrence of flash even more likely upon subsequent moldings.

Additional problems associated with prior art high pressure molding techniques include the increased amount of plastic material needed to be placed into the mold cavity, as well as the pressure gradients created throughout the molded part due to the increased amount of plastic material being packed into a finite volume mold cavity. In some cases, the pressure gradient is so large that it leads to warpage of the finished plastic article. If the warpage is great enough, the plastic article may not fit within design tolerances.

While theoretically it would be desirable to fill the mold cavity slowly throughout the molding process, it is difficult to inject the plastic material slowly without uneven curing and blockage resulting within the cavity. If the mold cavity is filled too slowly, the first portion of the plastic material to be injected into the mold cavity begins to harden as the rest of the plastic material is still being injected. This premature hardening leads to clogging of the mold cavity during the filling process. Such clogging is particularly undesirable since it requires stopping a molding run and discarding the partially hardened material.

The difficulties encountered in the prior art discussed hereinabove are substantially eliminated by the present invention.

SUMMARY OF THE INVENTION

It is an object of the present invention to provide a method for molding an injected plastic article which requires less clamping force than traditional plastic injection mold units.

Another object of the present invention is to provide a method for producing an injected plastic article without pressure gradients or warpage in the plastic article.

Yet another object of the present invention is to provide a method for molding an injected plastic article which reduces material costs in the molding process.

Still another object of the present invention is to provide a method for molding an injected plastic article which produces more uniform reproducible plastic articles.

Another object of the present invention is to provide a method for precisely filling a mold cavity of mold unit.

A further object of the present invention is to provide a method for precisely filling a mold cavity by injecting based upon a pressure-dominated controlled algorithm after detecting an indicia of a decrease in the surface area of the melt front.

These and other objects of the invention will become apparent upon reference to the following specification, drawings, and claims.

By the present invention, it is proposed to overcome the difficulties encountered heretofore. To this end, a method for directing and controlling the operation of an injection molding machine is provided. A first mold section and a second mold section are provided. To begin the molding process, the second mold section is pressed into sealed engagement with the first mold section to form a mold cavity. An injection device is provided in operable engagement with the mold cavity and a plastic material is injected into the mold cavity with the injection device at a predetermined rate and pressure. As the plastic material is injected into the mold cavity, the plastic material forms a melt front along a leading edge of the plastic material. Means for detecting an indicia of a decrease in the surface area of the melt front is provided, and after the means for detecting has detected the indicia of a decrease in the surface area of the melt front, the injection device is signalled to inject based upon a pressure-dominated controlled algorithm. By injecting based upon a pressure-dominated control algorithm, it is possible to reduce the amount of clamp pressure needed to keep the mold sections together, while still completely filling the mold cavity with plastic material. After the mold cavity is completely filled, and the injected plastic material has at least partially hardened, the resulting plastic article is removed from the mold cavity.

In the preferred embodiment of the present invention, a central processing unit is operably connected to both the injection device and means for detecting the indicia of a decrease in the surface area of the melt front. After the plastic material is placed within the injection device, the central processing unit signals the injection device to inject the plastic material into the mold cavity with the injection being based upon a rate-dominated control algorithm. Ideally, the plastic material is injected at a rate which deposits the plastic material into the mold cavity with an unbroken melt front along a leading edge of the plastic material. Thereafter, the central processing unit signals the injection device to increase the injection rate, and this increase in injection rate comes after approximately ten percent of the mold cavity is filled with plastic material. Preferably, the rate of injection is such that the melt front remains unbroken.

During the injection of the plastic material, the central processing unit continuously monitors the status of the melt front via the means for detecting the indicia of a decrease in the surface area of the melt front. After the means for detecting the indicia of a decrease in the surface area of the melt front has, in fact, detected the indicia of a decrease in the surface area of the melt front, the central processing unit signals the injection device to adjust the injection rate as needed so that a pressure set limit is not exceeded. In this manner, the plastic material is thereafter injected based upon a pressure-dominated control algorithm. Keeping the injection pressure below a pressure set point eliminates turbulence and allows the mold cavity to completely fill with plastic material, thereby eliminating the need for overpacking the mold cavity with plastic material.

DETAILED DESCRIPTION OF THE INVENTION

Figure 1:
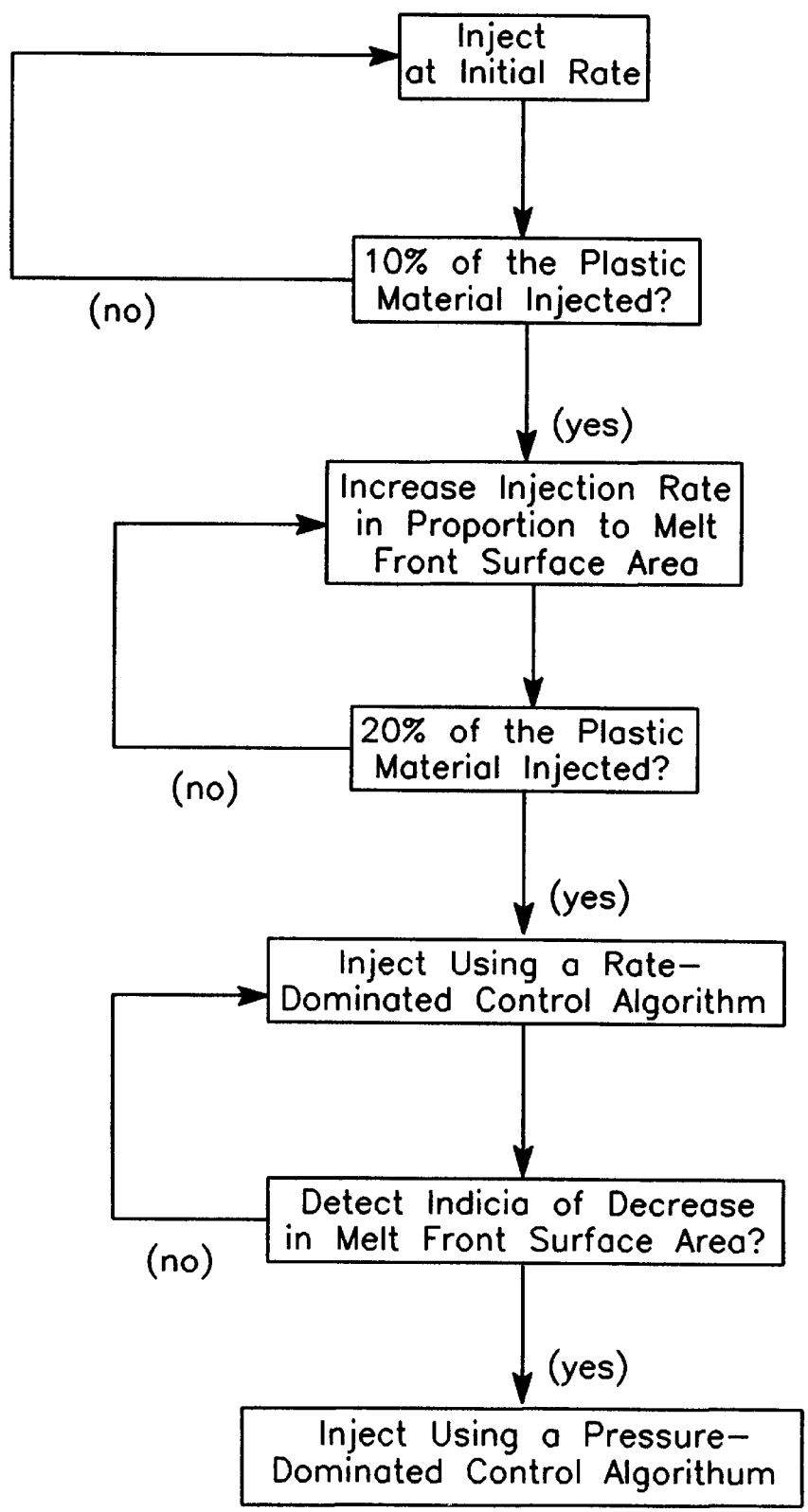
FIG. 1 is a flow chart showing the method of the present invention.

In the figures, there is shown a mold apparatus 10 including a mold unit 12, a mold frame 14, and a hydraulic piston 16. The mold frame 14 consists of four cylindrical support bars 18 which are secured to a first plate 20 and a second plate 22 by means of nuts 24. A carriage 26 is slidably attached to the support bars 18 through bores which pass through the corners of the carriage 26. Support blocks 28 are provided with bores and mounted to the corners of the carriage 26 to add extra support to the carriage 26 as it slides along the support bars 18. A cylinder block 30 is secured to the carriage 26 to evenly distribute force over the carriage 26. Secured to the cylinder block 30 is a piston rod 32. The piston rod 32 passes through a bore in the center of the second plate 22 and is connected to a hydraulic cylinder piston 16. The hydraulic cylinder piston 16 and piston rod 32 make up the hydraulic cylinder 34.

Secured to the side of the carriage 26 opposite the cylinder block 30 is a first mold section 36 which fits into sealed engagement with a second mold section 38 to form a mold cavity 40. The dimensions of the mold cavity 40 created by the first mold section 36 and second mold section 38 define the shape of the plastic article to be molded. The second mold section 38 is secured to the first plate 20 which, in turn, is secured to the mold frame support bars 18 of the mold frame 14. The first plate 20 is secured on a first pair of support legs 42 and the second plate 22 is secured on a second pair of support legs 44. The support legs 42 and 44 position the mold unit 12 at the proper height for the molding process.

Provided in the first plate 20 is an inlet sprue 46 which connects to a runner 48 provided in the second mold section 38. Because the present method uses slower injection than prior art methods, the size of the sprue 46 is preferably larger than sprues of the prior art. The larger sprue 46 allows a greater amount of plastic material 82 to enter the mold cavity 40 through the sprue 46. Unlike heated sprues of the prior art, the sprue 46 of the present invention is not required to be heated due to its increased size. The runner 48 allows plastic material 82 to pass from the sprue 46 into the mold cavity 40.

Provided for operable engagement with the inlet sprue 46 is an injection device 50 which prepares and injects the plastic material 82 into the mold cavity 40. The injection device 50 is provided with an injection barrel 52 supported by a main frame 54. A nozzle unit 56 is mounted at one end of the injection barrel 52 and a hopper 58 is mounted to the top of the injection barrel 52. Positioned coaxially within the injection barrel 52 is a reciprocating screw 60 with attached flights (not shown) for plasticizing and moving the plastic material 82 forward within the injection barrel 52 and toward the nozzle unit 56. A variable volume, pressure compensated hydraulic pump 62 operates to move the injection screw 60 relative to the injection barrel 52 during the injection molding process. The injection device 50 is provided with a large rotational motor 72 which turns the injection screw 60 to plasticize the plastic injection material 82 before injection.

The nozzle unit 56 is movable into and out of operative association with the sprue 46 upon a reciprocal movement of a carriage 64 relative to the main frame 54. This reciprocal movement is responsive to the operation of a double acting cylinder 66 pivotally interconnected between the carriage 64 and the main frame 54. The operation of the double acting cylinder 66 is controlled by a linear displacement transducer 68 mounted on the mainframe 54 for coacting engagement with a limit member 70 on the carriage 64.

The injection device 50 is operably coupled to a central processing unit 74 which monitors the progress of the injection process and signals the injection device 50 accordingly. The central processing unit 74 shown is a personal computer, but the central processing unit 74 may, of course, be any system capable of monitoring the progress of a plastic injection run and controlling the injection in response thereto. A linear transducer 76 is coupled to the central processing unit 74, and the linear transducer 76 is coupled to the injection screw 60 so that the central processing unit 74 can monitor the distance that the injection screw 60 travels and therefore monitor the rate of injection of plastic material. The linear transducer 76 correlates movement of the injection screw 60 to a predetermined amount of the plastic material injected into the mold cavity 40. As each incremental amount of plastic material 82 within the injection device 50 is injected into the mold cavity 40, the linear transducer 76 monitors the associated incremental movement of the injection screw 60. Preferably the linear transducer 76 measures increments of plastic material 82 of one gram or less, which translates into approximately four thousand increments for a typical molding operation.

So that the central processing unit 74 can monitor the pressure at which plastic material is injected into the mold cavity 40, the central processing unit 74 is coupled to a pressure monitor 78, and the pressure monitor 78 is operably coupled to the hydraulic pump 62. The central processing unit 74 is also operably coupled to an injection control 80 which enables the central processing unit 74 to manipulate the injection of the plastic material 82.

To begin the molding process, the first mold section 36 is pressed into sealed engagement with the second mold section 38 by the hydraulic piston 16. Once the mold sections 36 and 38 have been pressed into sealed engagement to form the mold cavity 40, the double acting cylinder 66 moves the nozzle unit 56 of the injection device 50 into engagement with the injection sprue 46. The plastic material 82 is deposited into the hopper 58 and the reciprocating screw 60 is revolved with the motor 72 to plasticize the plastic material 82 and to transfer the plastic material 82 from the hopper 58 into the injection barrel 52. The reciprocating screw 60 is operably coupled to a variable back pressure relief valve which is well known in the art (not shown). Commands sent to the relief valve by the central processing unit 74 during the plasticization stage determine the condition of the plastic material 82, increment by increment before it is injected into the molding cavity 40.

Figure 3A:
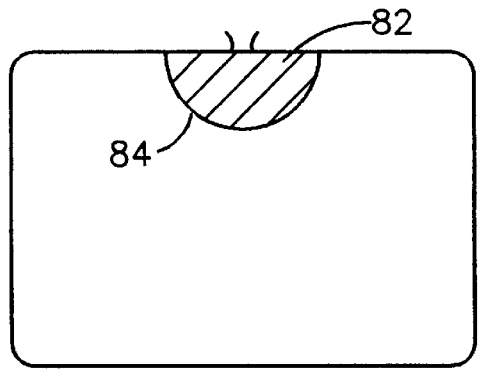
FIGS. 3a–e are top plan views of the mold cavity of the present invention in partial cross-section, showing the progress of plastic material through the mold cavity.

When the injection barrel 52 is filled with properly plasticized plastic material 82, the reciprocating screw 60 pushes the plastic material 82 toward the nozzle unit 56. The plasticized plastic material 82 is thereby transferred from the injection barrel 52 into the sprue 46 and runner 48. From the runner 48, the plastic material 82 enters the mold cavity 40 (FIG. 3a). The first mold section 36 and second mold section 38 are preferably maintained at a constant temperature to prevent the plastic material 82 from prematurely hardening on the walls of the mold cavity 40. This is in direct contravention of prior art methods which teach significantly cooling the mold section to speed hardening and thereby increase production rates.

Initial injection of the plastic material 82 into the mold cavity 40 is at a predetermined rate which is greatly reduced from prior art methods. Prior art methods splatter the plastic material 82 throughout the mold cavity 40 which leads to undesirable unfilled voids. In the present method the predetermined rate is sufficiently slow to allow the plastic material 82 to enter the mold cavity 40 with an unbroken melt front 84 as shown in FIG. 3a. This pre-determined initial injection rate may be determined by trial and error. If the initial injection rate is too high, the plastic material 82 entering the mold cavity 40 splatters. This splattering is a result of high pressure injection used in the prior art, and is undesirable since it results in asymmetrical filling of the mold cavity. The asymmetrical filling leads to a mold cavity 40 with various unfilled portions. Since these unfilled portions are scattered randomly about the mold cavity 40, it is not possible to fill these portions merely by adding more plastic material 82 at the previous rate.

To overcome this partial nonfilling problem, prior art processes "pack" an excess amount of plastic material 82 into the mold cavity 40 under extremely high pressure. This high pressure causes excessive strain on the clamping unit and creates finished parts that have hardened with internal pressure gradients. The pressure gradients may lead to warpage of the finished product and may, in extreme circumstances, cause the plastic article to be discarded as unusable. The high pressure also leads to "flashing" whereby material seeps between the mold sections during the molding process. This "flash," apparent on some prior art products, is caused when the extreme pressure developed during the packing phase forces the mold sections slightly apart enough so that the plastic material can seep along the parting line. As the plastic hardens, the finished plastic article is left with a ridge of hardened plastic along the parting line of the mold unit. In addition to being undesirable and wasteful, over time this flash can lead to premature wear of the mold sections as the clamp attempts to push the mold sections together against the hardened plastic.

In contrast, in the present method, as shown in FIG. 3a, as the plastic material 82 enters the mold cavity 40, an initial unbroken melt front 84 is formed within the mold cavity 40. To determine the initial rate of injection, the movement of the linear transducer 76 is correlated against time of injection by the central processing unit 74. Since the linear transducer 76 is correlated to monitor the injection of the plastic material 82 into the mold cavity 40 in discreet increments, the linear transducer 76 detects incremental movements of the reciprocating screw 60 and transfers this information to the central processing unit 74 for each increment of plastic material 82 that is injected into the mold cavity 40.

Figure 3B:
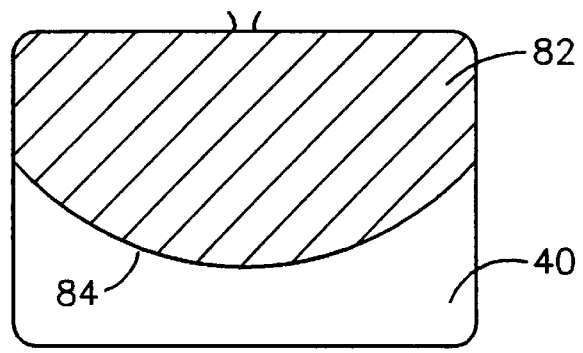
Figure 3C:
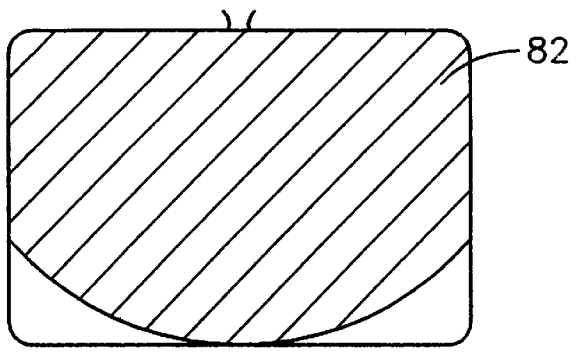
Figure 3D:
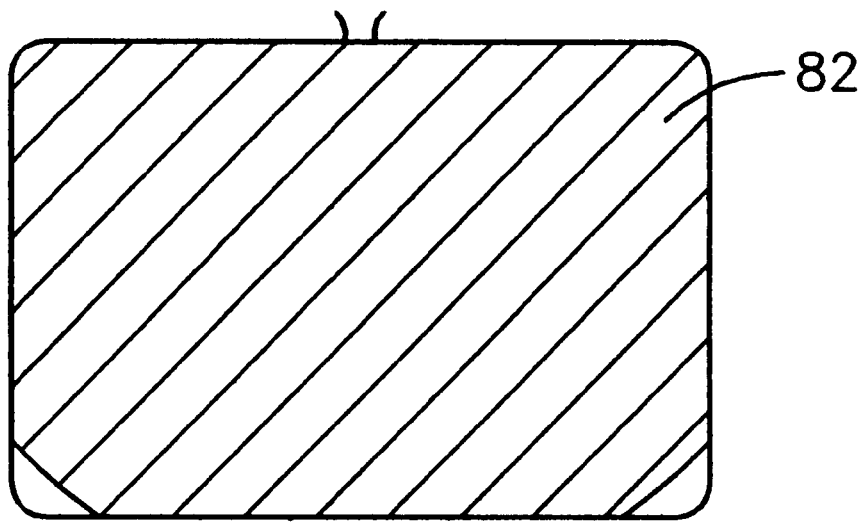

During the injection process, it is advantageous to maintain the melt front 84 intact to avoid splattering and asymmetrical filling of the mold. As more plastic material 82 is injected into the mold cavity 40, the melt front 84 grows larger as shown in FIG. 3b. As the melt front 84 gains a larger and larger surface area, the plastic material 82 may be injected into the mold cavity 40 at a higher rate without causing the melt front 84 to break. The increased injection rate will not increase the actual pressure along any particular point of the melt front 84 as long as the injection rate is increased no faster than the rate at which the surface area of the melt front 84 grows. When the surface area of the melt front 84 has decreased as shown in FIG. 3c, it is not desirable to keep injecting the plastic material 82 at a high rate and pressure as is done in prior art methods. In contrast, it is preferable to inject using a pressure-dominated control algorithm to keep the injection pressure below a pressure set point once the surface area of the melt front 84 begins to decrease as shown in FIG. 3d. By keeping the injection pressure below the pressure set point, many advantages are realized. For example, less clamping pressure is needed to keep the mold sections 36 and 38 together. Consequently, there is less wear on the mold apparatus 10 generally. Also, it takes less clamping pressure to avoid "flash." Additionally, pressure gradients are less likely to occur on the resulting plastic article.

Figure 2:
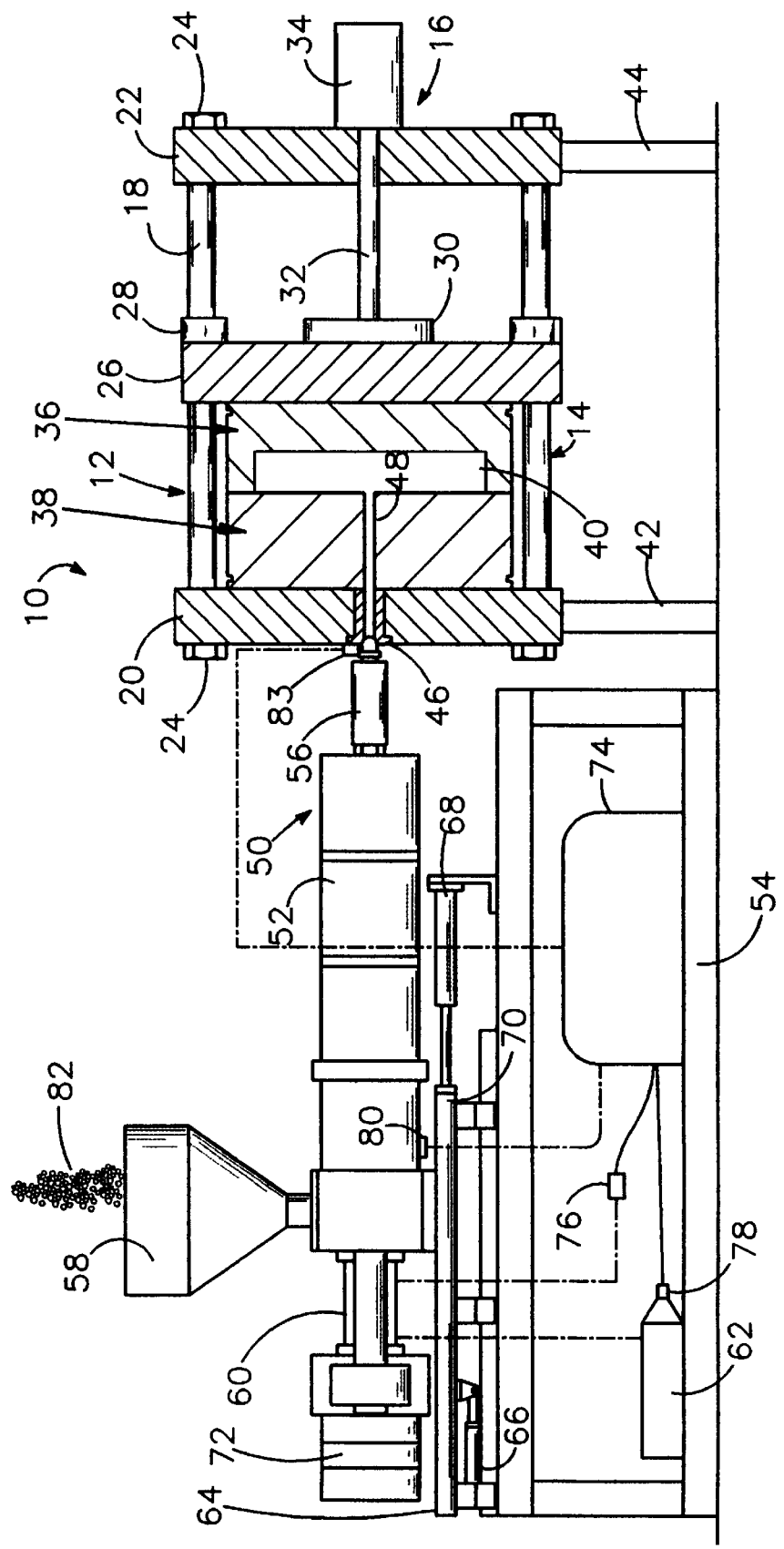
FIG. 2 is a side elevation of a molding apparatus including a pressure transducer on a nozzle unit in accordance with the present invention.

To implement the timing of injecting the plastic material 82 based on the pressure-dominated control algorithm to keep the injection pressure below the pressure set point, means for detecting an indicia of a decrease in the surface area of the melt front 84 is provided. In the preferred embodiment, as shown in FIG. 2, the means for detecting an indicia of a decrease in the surface area of the melt front 84 is a pressure transducer 83 on the nozzle unit 56. The pressure transducer 83 is coupled to the central processing unit 74 so that the central processing unit can monitor the pressure within the mold cavity 40. When the pressure transducer 83 detects a significant pressure increase in the mold cavity 40, this is an indicia of a decrease in the surface area of the melt front 84. The central processing unit 74 then signals the injection device 50 to inject using a pressure-dominated control algorithm and the injection rate is adjusted as needed so that the pressure set limit is not exceeded. The central processing unit 74 signals the injection device 50 through the injection control 80.

Figure 4:
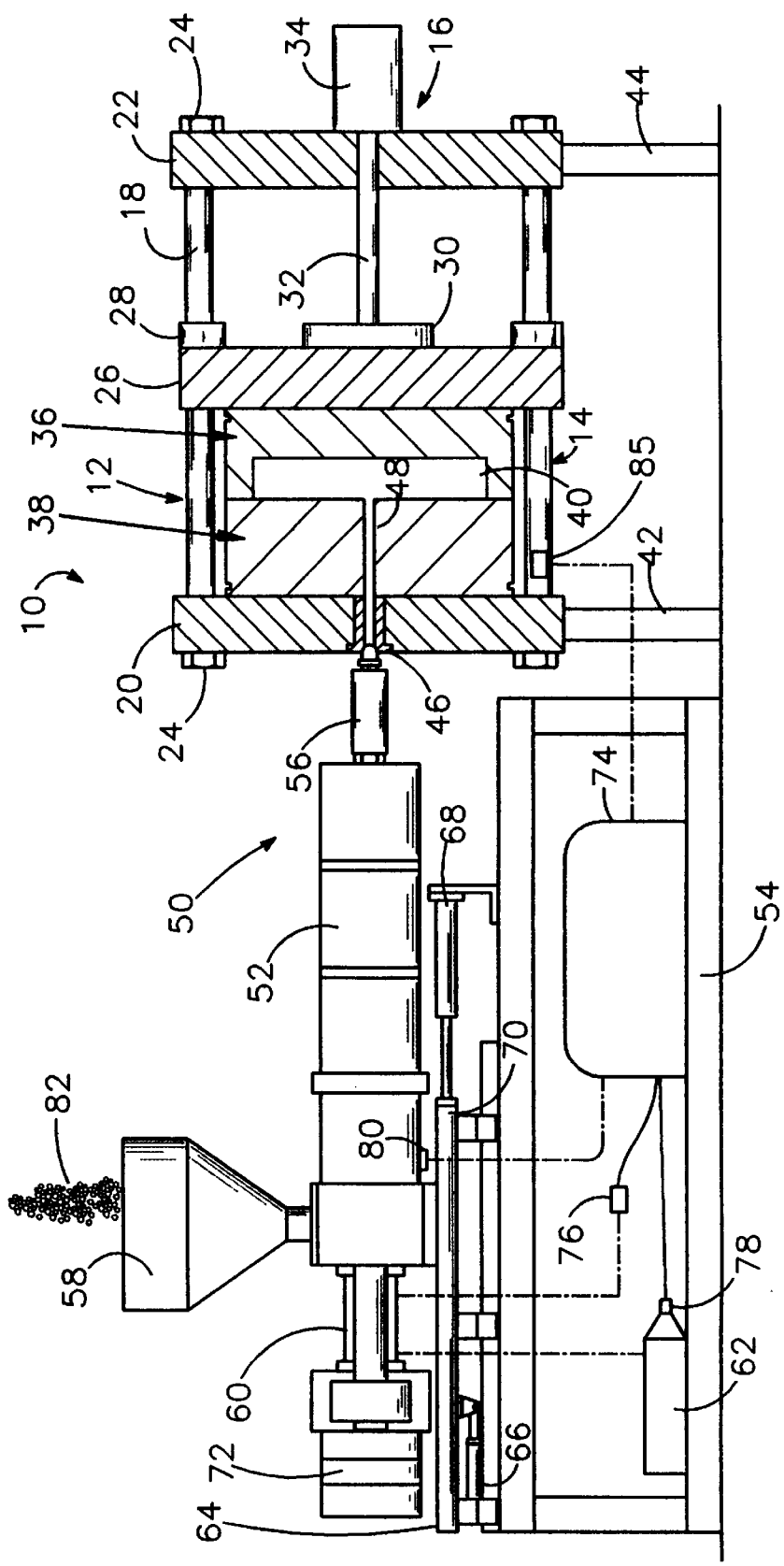
FIG. 4 is a side elevation of a molding apparatus including a strain gauge on a support bar in accordance with the present invention.

There are alternative means for detecting an indicia of a decrease in the surface area of the melt front 84. As shown in FIG. 4, the means for detecting an indicia of a decrease in the surface area of the melt front 84 may be a strain gauge 85 on the support bar 18. The strain gauge 85 is coupled to the central processing unit 74 so that the central processing unit can monitor the strain on the support bar 18. When the strain gauge 85 detects a significant increase in strain on the support bar 18, this is an indicia of a decrease in the surface area of the melt front 84. The central processing unit 74 then signals the injection device 50 to inject using a pressure-dominated control algorithm and the injection rate is adjusted as needed so that the pressure set limit is not exceeded. The central processing unit 74 signals the injection device 50 through the injection control 80.

Figure 5:
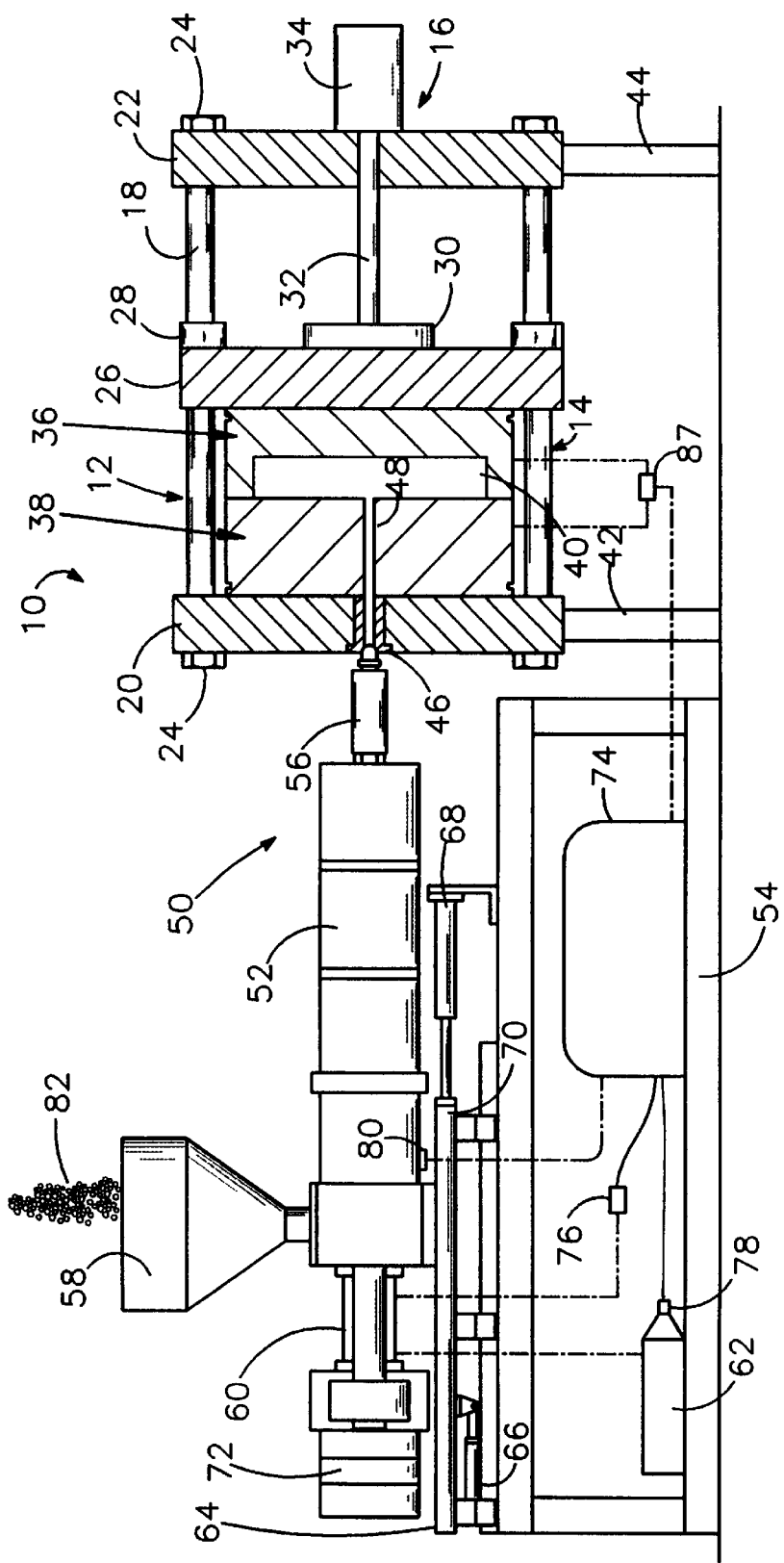
FIG. 5 is a side elevation of a molding apparatus including a distance gauge between mold sections in accordance with the present invention.

Alternatively, as shown in FIG. 5, the means for detecting an indicia of a decrease in the surface area of the melt front 84 may be a distance gauge 87 between the mold sections 36 and 38. The distance gauge 87 is coupled to the central processing unit 74 so that the central processing unit can monitor the distance between the mold sections 36 and 38. When the distance gauge 87 detects a very slight separation between the mold sections 36 and 38, this is an indicia of a decrease in the surface area of the melt front 84. The central processing unit 74 then signals the injection device 50 to inject using a pressure-dominated control algorithm and the injection rate is adjusted as needed so that the pressure set limit is not exceeded. The central processing unit 74 signals the injection device 50 through the injection control 80.

Figure 6:
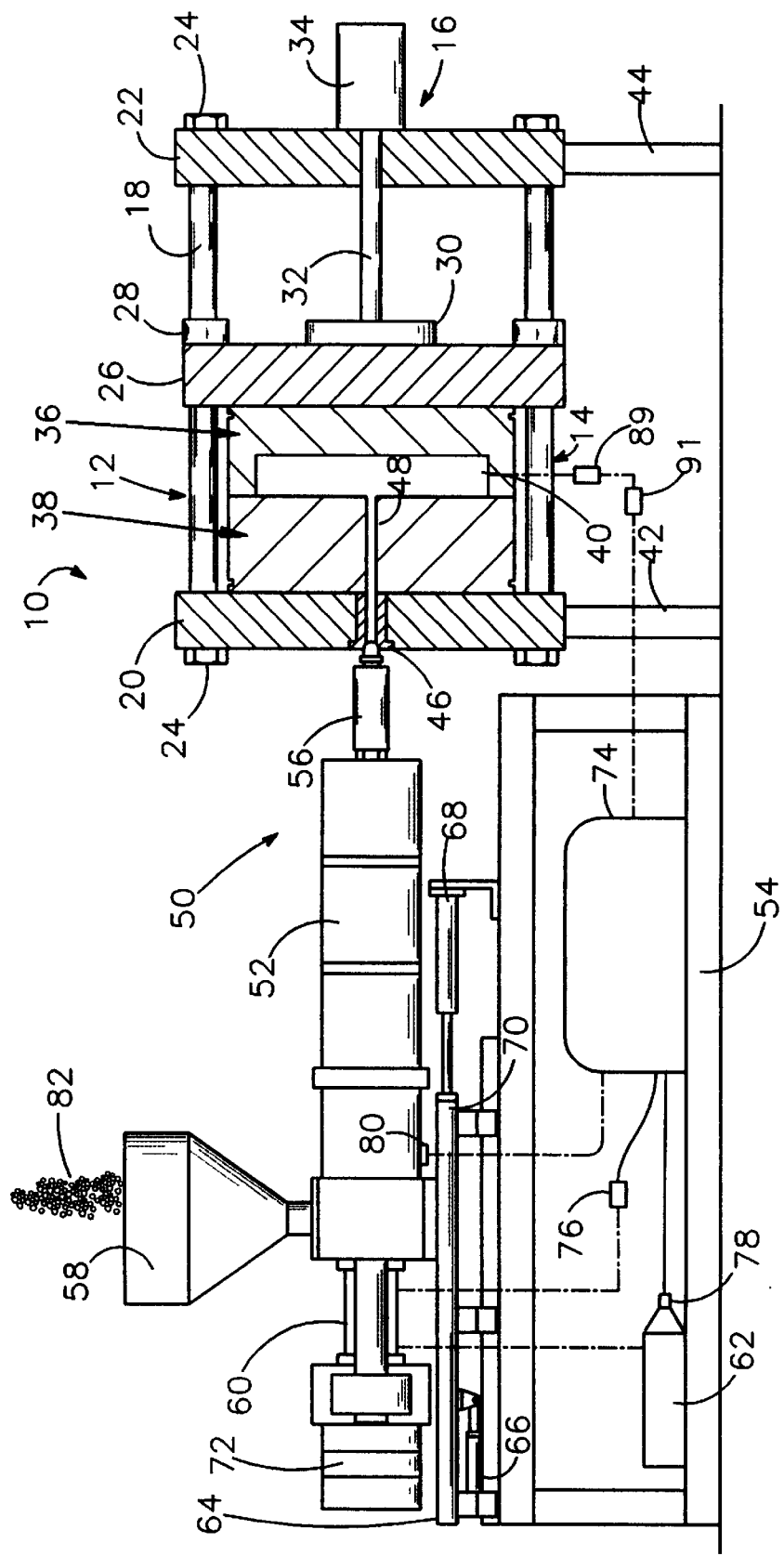
FIG. 6 is a side elevation of a molding apparatus including an air vent meter on a mold vent of a mold cavity in accordance with the present invention.

As shown in FIG. 6, the means for detecting an indicia of a decrease in the surface area of the melt front 84 may be an air vent meter 91 connected to a mold vent 89 of the mold cavity 40. The air vent meter 91 is coupled to the central processing unit 74 so that the central processing unit can monitor the amount of air vented from the mold cavity 40. When the air vent meter 91 detects a significant decrease in the amount of air vented from the mold cavity 40, this is an indicia of a decrease in the surface area of the melt front 84. The central processing unit 74 then signals the injection device 50 to inject using a pressure-dominated control algorithm and the injection rate is adjusted as needed so that the pressure set limit is not exceeded. The central processing unit 74 signals the injection device 50 through the injection control 80.

Figure 8:
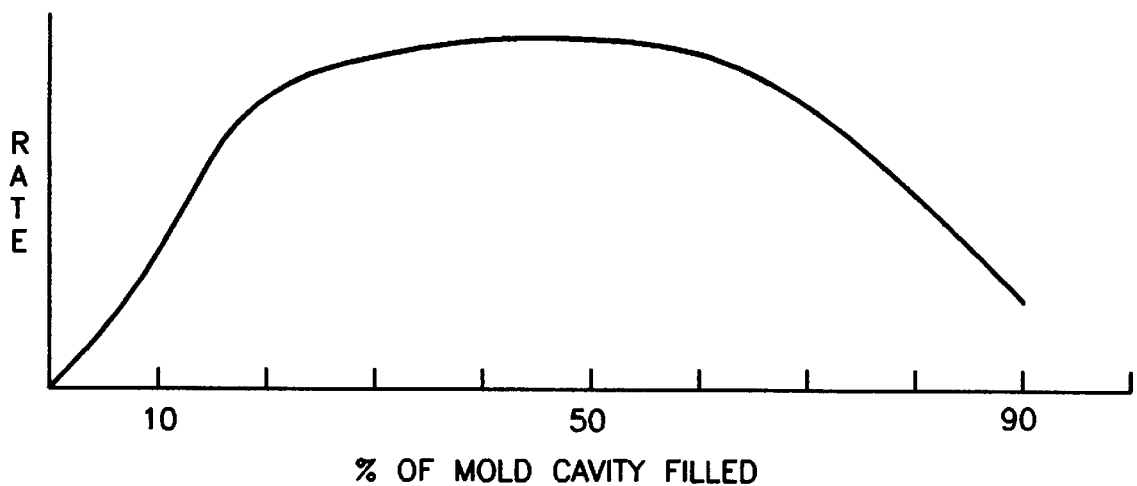
FIG. 8 is a graphic representation of the injection rate during the molding process of the present invention.

As shown in FIG. 1, regardless of the structure implemented to detect the indicia of a decrease in the surface area of the melt front 84 (FIG. 3d), the plastic material 82 is injected into the mold cavity 40 at an initial pre-determined injection rate until the central processing unit 74 receives information from the linear transducer 76 that ten percent of the increments of the plastic material 82 have been injected into the mold cavity 40 (FIGS. 1, 3a, and 8). Once ten percent of the increments have been injected, the central processing unit 74 signals the injection control 80 to increase the injection rate in proportion to the amount of plastic material 82 which has been injected into the mold cavity 40. Because the surface area of the melt front 84 at any given time is roughly proportionate to the amount of plastic material 82 which has been injected into the mold cavity 40, increasing the injection rate in proportion to the amount of plastic material 82 injected into the mold cavity 40 results in an increase in the rate of injection which is proportionate to the surface area of the melt front 84. It should be noted that the increase may be initiated after between about two percent and five percent of the plastic material 82 has been injected into the mold cavity 40.

The injection rate is increased in proportion to the surface area of the melt front 84 until twenty percent of the increments of the plastic material 82 have been injected into the mold cavity 40 (FIGS. 1, 3b and 8). Increasing the injection in proportion to the surface area of the melt front 84 indefinitely, however, would lead to an undesirably high injection rate which would be too difficult to slow. Accordingly, after twenty percent of the increments of the plastic material 82 have been injected into the mold cavity 40, the injection is continued using a rate-dominated control algorithm to maintain the melt front 84 at a desirable injection rate. The rate-dominated control algorithm may be initiated any time after the increase in injection rate has begun and is preferably discontinued when the central processing unit 74 determines that there has been a decrease in the surface area of the melt front 84. The exact rate-dominated algorithm controlling the rate at which the plastic material 82 is injected into the mold cavity 40 is not of critical importance, and may be customized to provide desirable filling characteristics based upon a mold flow analysis of the particular mold cavity 40.

Figure 7:
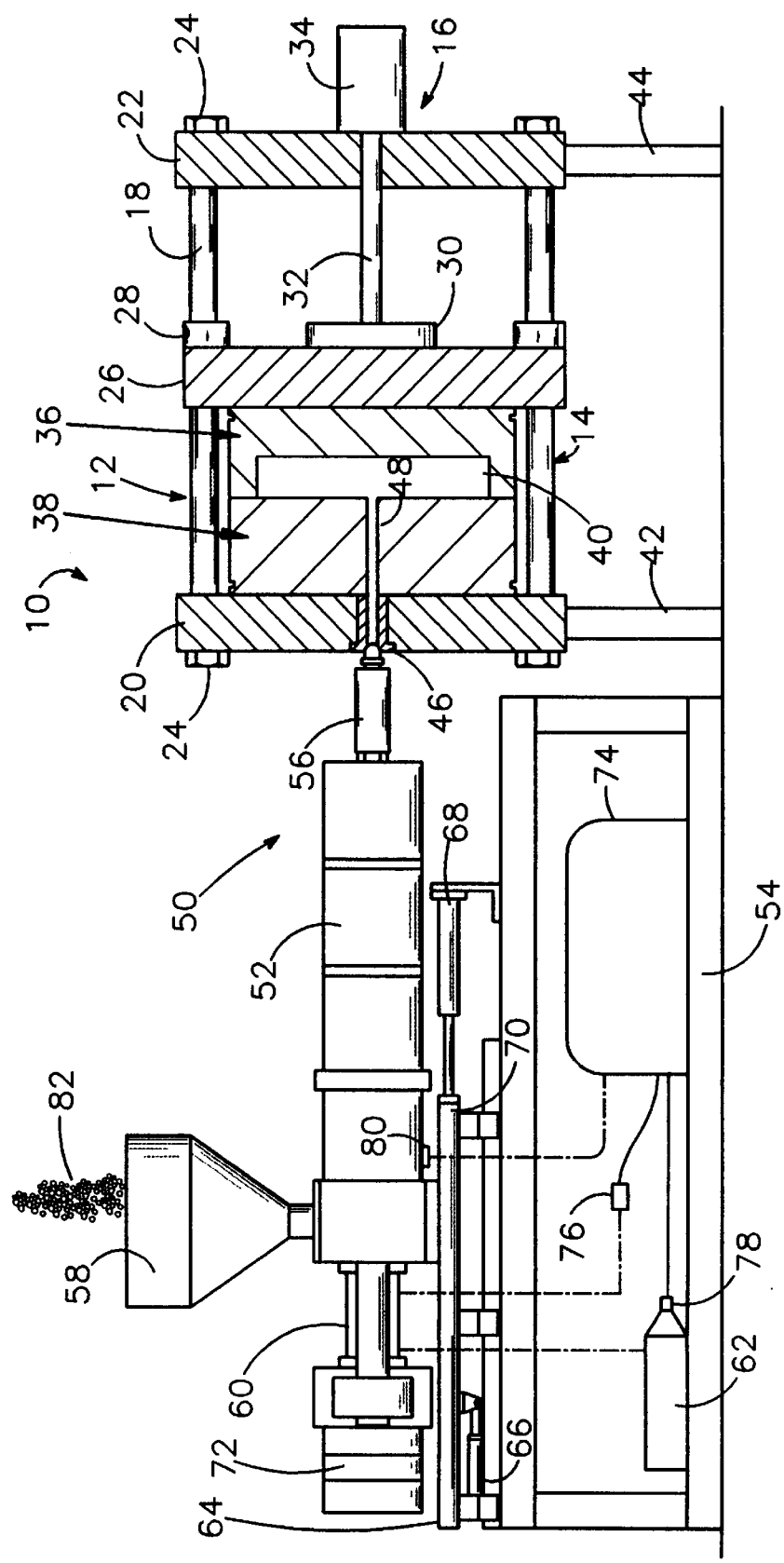
FIG. 7 is a side elevation of a molding apparatus not including means for detecting an indicia of a decrease in the surface area of the melt front.

When the central processing unit 74 determines that there has been a decrease in the surface area of the melt front 84, the central processing unit 74 signals the injection control 80 to inject the plastic material 82 based upon a pressure-dominated control algorithm, rather than the rate-dominated control algorithm used to inject the majority of the plastic material 82. Of course, if the mold cavity 40 is such that it is predictable as to how much plastic material 82 needs to be injected before the surface area of the melt front 84 starts to decrease, it is possible to shift from the rate-dominated control algorithm to the pressure-dominated control algorithm after injecting a pre-determined amount of plastic material 82. In this case, as shown in FIG. 7, it would not be necessary to provide means for detecting an indicia of a decrease in the melt front 82 to determine when to shift to the pressure-dominated control algorithm. Regardless of whether means for detecting an indicia of a decrease in the melt front 84 is provided, the plastic material 82 is injected based upon a pressure-dominated control algorithm to ensure that the pressure set limit is not exceeded. As a result, the backflow and turbulence associated with the prior art methods is avoided. Because the prior art makes no correlation between injection pressure and the speed at which the plastic material 82 fills the mold cavity 40, there is no way to anticipate the endpoint for the filling of the mold cavity 40. Therefore, in prior art techniques, there is no way to accurately reduce the pressure to prevent turbulence and backflow. Indeed, the prior art methods actually increase the ending pressure to force an overflow amount of plastic material into the mold cavity.

Figure 3E:
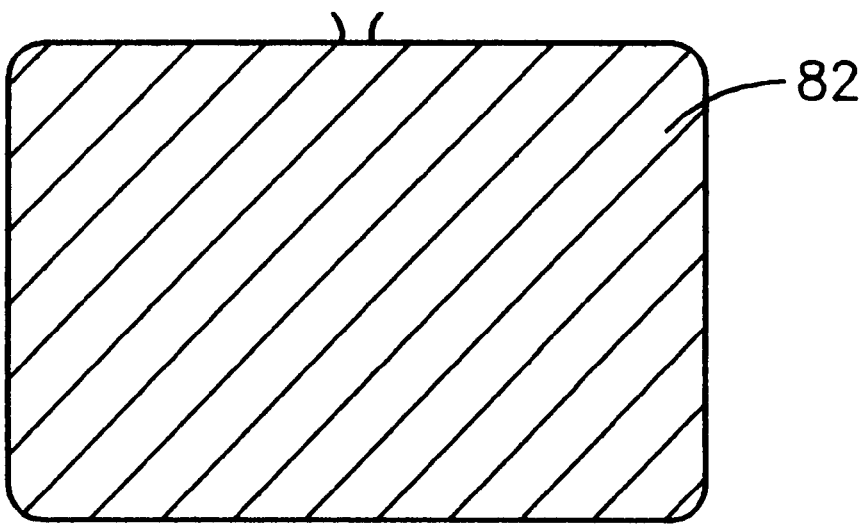

Like the rate-dominated control algorithm, the pressure-dominated control algorithm of the present method can be determined based upon mold flow characteristics of the particular mold cavity 40. The central processing unit 74 receives input from the pressure monitor 78 to maintain a pressure on the plastic material 82. Preferably this pressure is sufficient to completely fill the mold cavity 40, without causing the plastic material 82 to splash, or the melt front 84 to break before the mold cavity 40 is filled (FIG. 3e).

Figure 9:
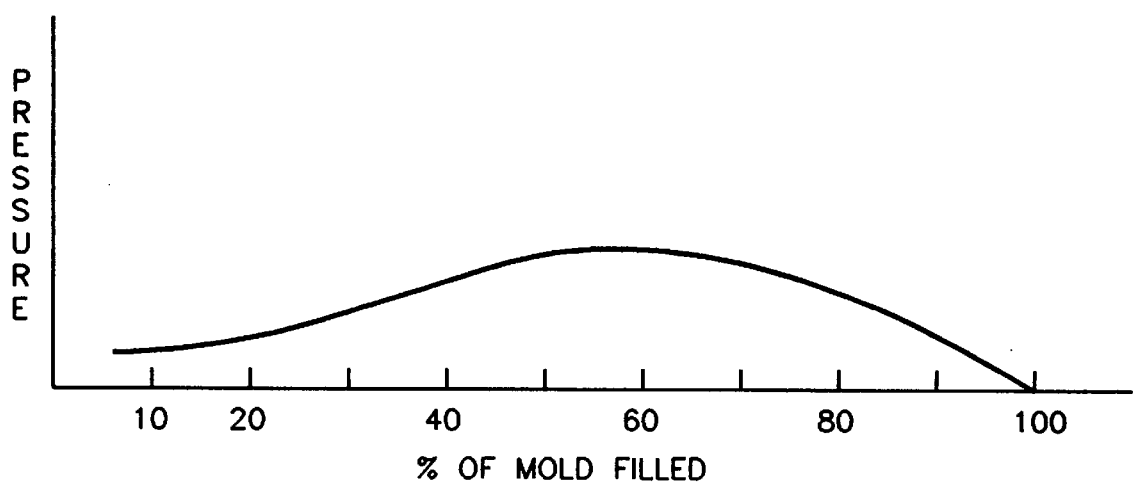
FIG. 9 is a graphic representation of the injection pressure during the molding process of the present invention.

As shown in FIGS. 3d and 9, the pressure is manipulated to prevent any aberrations in the melt front 84 during the last portion of the injection process. As shown in FIG. 3e, the present method evenly fills the entire mold cavity 40, thereby eliminating the need for prior art "packing" techniques required to fill unfilled portions produced by excessive injection rates and broken melt fronts. The central processing unit 74 triggers the injection control 80 to cease injection of plastic material 82 into the mold cavity 40 at the proper point to fill the mold cavity 40 exactly. By providing the mold cavity 40 with precisely the amount of plastic material 82 that is needed to fill the mold cavity 40, there is a material savings over prior art packing processes. The central processing unit 74 preferably coordinates the size of the shot with the rate-dominated injection and the pressure-dominated injection to achieve the proper balance between rapid and accurate fillings of the mold cavity 40.

Near the end of the molding cycle in prior art processes, there is a pressure spike when the plastic material reaches the end of the mold cavity and begins to backflow. This pressure is returned back to the injection gate and requires large amounts of clamping force to maintain the mold sections together against this end pressure. As this pressure is spread throughout the plastic material during the hardening process, the finished part often has molded-in stress which may weaken or discolor the part. Because packing is eliminated in the present invention, less clamping force is required to maintain the mold cavity 40 during the mold process and molded in stress is reduced. Whereas two and one-half to three tons of clamp pressure per square inch may be required to hold the mold sections together in a prior art molding operation, one-half to one ton of clamp pressure per square inch may be used in molding a similar part by the present method.

Since the present method eliminates the pressure spike at the end of the molding process as shown in FIG. 9, less strength is required of the mold sections 36 and 38. Accordingly, lighter weight aluminum may be used to make the mold sections. Additionally, prior art molding machines with pressure related fractures of their steel mold sections may be retrofitted with the aluminum mold sections 36 and 38 of the present invention. This allows the molding machine to be quickly returned to operation using the present inventive method. The reduction in clamping force also allows the use of cheaper, lighter, and smaller clamps. Furthermore, because the stress on the mold sections 36 and 38 is reduced, there is less chance of failure of the mold sections of the present invention and therefore less chance of the accompanying costly downtime.

Once the mold cavity 40 is filled, the plastic material 82 is allowed to harden within the mold cavity 40 (FIG. 3e). After the plastic material 82 has hardened, the hydraulic piston 16 is actuated to move the movable mold section 36 away from the stationary mold section 38 so that the hardened plastic material 82 may be removed from the mold apparatus 10. Because the present invention eliminates the excessive prior art pressures during the hardening phase, the resulting plastic article is free of pressure gradients and warpage. This allows the present invention to produce a more uniform, reproducible plastic article.

The foregoing description and drawings merely explain and illustrate the invention. The invention is not limited thereto, except insofar as the claims are so limited, as those skilled in the art who have a disclosure before them will be able to make modifications and variations therein without departing from the scope of the invention. For example, it is anticipated to be within the scope of the invention that fabric may be maintained against one or both of the mold sections 36 and 38 during the molding process to provide a finished plastic article with a molded-in fabric covering. The large sprue 46 and slow injection of the present invention decrease the incidences of wrinkling or tearing the fabric over prior art methods.

What is claimed is:

1. A method for directing and controlling the flow of plastic material into a mold cavity to mold a plastic article, said method comprising:
   a) providing a first mold section;
   b) providing a second mold section;
   c) clamping said second mold section into sealed engagement with said first mold section to form a mold cavity;
   d) providing an injection device in operable communication with said mold cavity;
   e) injecting a plastic material at a predetermined rate and pressure into said mold cavity with said injection device, said plastic material forming a melt front having a surface area along a leading edge of said plastic material;
   f) providing means for detecting an indicia of a decrease in said surface area of said melt front along said leading edge of said plastic material in said mold cavity;
   g) detecting said indicia of said decrease in said surface area of said melt front with said means for detecting;
   h) after detecting said indicia of said decrease in said surface area of said melt front with said means for detecting, signaling said injection device to inject said plastic material based upon a pressure-dominated control algorithm, and reducing the pressure thereby avoiding packing the mold cavity; and
   i) removing the plastic article from said mold cavity after completely filling said mold cavity with said plastic material and after at least partial hardening of said plastic material.

2. The method of claim 1, further comprising increasing the rate of injection of plastic material into said mold cavity.

3. The method of claim 2, wherein said step of increasing the rate of injection of plastic material includes increasing the rate of injection in proportion to the surface area of said melt front.

4. The method of claim 2, wherein said step of increasing the rate of injection of plastic material is instigated only after a predetermined portion of said plastic material has been injected into said mold cavity.

5. The method of claim 1, wherein said step of signaling said injection device to inject said plastic material based upon a pressure-dominated control algorithm is instigated only after a predetermined portion of said plastic material has been injected into said mold cavity.

6. The method of claim 2, further comprising:
   (a) providing a linear transducer on said injection device; and
   (b) monitoring the amount of said plastic material injected into said mold cavity with said linear transducer.

7. The method of claim 6, further comprising controlling said step of injecting said plastic material, and said step of increasing the rate of injection of plastic material, with a central processing unit which is operably coupled to said linear transducer.

8. The method of claim 1, wherein said step of signaling said injection device to inject said plastic material based upon a pressure-dominated control algorithm includes providing a central processing unit operably coupled to said injection device.

9. The method of claim 2, wherein said step of increasing the rate of injection of plastic material comprises injecting said plastic material into said mold cavity using a rate-dominated control algorithm.

10. The method of claim 1, further comprising injecting said plastic material into said mold cavity using a pressure-dominated control algorithm after signaling said injection device to inject said plastic material based upon a pressure-dominated control algorithm.

11. The method of claim 1, wherein said step of providing means for detecting an indicia of a decrease in said surface area of said melt front comprises monitoring pressure within said mold cavity.

12. The method of claim 11, wherein said step of monitoring pressure within said mold cavity comprises providing a pressure transducer on said injection device.

13. The method of claim 12, further comprising providing a central processing unit coupled to said pressure transducer and said injection device.

14. The method of claim 1, wherein said step of providing means for detecting an indicia of a decrease in said surface area of said melt front comprises:
   (a) providing at least one support bar, at least one of said mold sections slideable along said support bar; and
   (b) monitoring strain on said support bar.

15. The method of claim 14, wherein said step of monitoring strain on said support bar comprises providing at least one strain gauge on said support bar.

16. The method of claim 15, further comprising providing a central processing unit coupled to said strain gauge and said injection device.

17. The method of claim 1, wherein said step of providing means for detecting an indicia of a decrease in said surface area of said melt front comprises monitoring distance between said first mold section and said second mold section.

18. The method of claim 17, wherein said step of monitoring distance between said first mold section and said second mold section comprises providing a distance gauge between said first mold section and said second mold section.

19. The method of claim 18, further comprising providing a central processing unit coupled to said distance gauge and said injection device.

20. The method of claim 1, wherein said step of providing means for detecting an indicia of a decrease in said surface area of said melt front comprises monitoring venting of air from said mold cavity.

21. The method of claim 20, wherein said step of monitoring venting of air from said mold cavity comprises:
   (a) providing a mold vent on at least one of said mold sections, and
   (b) providing an air vent meter on said mold vent.

22. The method of claim 21, further comprising providing a central processing unit coupled to said air vent meter and said injection device.

23. A method for directing and controlling the flow of plastic material into a mold cavity to mold a plastic article, said method comprising:
   a) providing a first mold section;
   b) providing a second mold section;
   c) clamping said second mold section into sealed engagement with said first mold section to form a mold cavity;
   d) providing an injection device in operable communication with said mold cavity;
   e) providing a linear transducer on said injection device
   f) providing a central processing unit operably coupled to said linear transducer and said injection device;
   g) injecting a plastic material at a predetermined rate and pressure into said mold cavity with said injection device, said plastic material forming a melt front having a surface area along a leading edge of said plastic material, said central processing unit controlling said step of injecting said plastic material;
   h) increasing the rate of injection of plastic material using a rate-dominated control algorithm, said central processing unit controlling said step of increasing the rate of injection of plastic material;
   i) providing means for detecting an indicia of a decrease in said surface area of said melt front along said leading edge of said plastic material in said mold cavity;
   j) detecting said indicia of said decrease in said surface area of said melt front with said means for detecting;
   k) after detecting said indicia of said decrease in said surface area of said melt front with said means for detecting, signaling said injection device to inject said plastic material based upon a pressure-dominated control algorithm, and reducing the pressure thereby avoiding packing the mold cavity; and
   l) removing the plastic article from said mold cavity after completely filling said mold cavity with said plastic material and after at least partial hardening of said plastic material.

24. The method of claim 23, wherein said step of increasing the rate of injection of plastic material includes increasing the rate of injection in proportion to the surface area of said melt front.

25. The method of claim 23, wherein said step of increasing the rate of injection of plastic material is instigated only after a predetermined portion of said plastic material has been injected into said mold cavity.

26. The method of claim 23, wherein said step of signaling said injection device to inject said plastic material based upon a pressure-dominated control algorithm is instigated only after a predetermined portion of said plastic material has been injected into said mold cavity.

27. The method of claim 23, wherein said step of providing means for detecting an indicia of a decrease in said surface area of said melt front comprises monitoring pressure within said mold cavity.

28. The method of claim 27, wherein said step of monitoring pressure within said mold cavity comprises providing a pressure transducer on said injection device.

29. The method of claim 28, wherein said pressure transducer is coupled to said central processing unit.

30. The method of claim 23, wherein said step of providing means for detecting an indicia of a decrease in said surface area of said melt front comprises:

(a) providing at least one support bar, at least one of said mold sections slideable along said support bar; and (b) monitoring strain on said support bar.

31. The method of claim 30, wherein said step of monitoring strain on said support bar comprises providing at least one strain gauge on said support bar.

32. The method of claim 31, wherein said strain gauge is coupled to said central processing unit.

33. The method of claim 23, wherein said step of providing means for detecting an indicia of a decrease in said surface area of said melt front comprises monitoring distance between said first mold section and said second mold section.

34. The method of claim 33, wherein said step of monitoring distance between said first mold section and said second mold section comprises providing a distance gauge between said first mold section and said second mold section.

35. The method of claim 34, wherein said distance gauge is coupled to said central processing unit.

36. The method of claim 23, wherein said step of providing means for detecting an indicia of a decrease in said surface area of said melt front comprises monitoring venting of air from said mold cavity.

37. The method of claim 36, wherein said step of monitoring venting of air from said mold cavity comprises:

(a) providing a mold vent on at least one of said mold sections, and (b) providing an air vent meter on said mold vent.

38. The method of claim 37, wherein said air vent meter is coupled to said central processing unit.

* * * * *